United States Patent [19]

Caporin et al.

[11] 3,944,965
[45] Mar. 16, 1976

[54] OVERFLOW THRESHOLD CONTROL FOR SONAR

[75] Inventors: Edward A. Caporin, Centreville; Joseph Abruzzo, Severna Park; Frank L. Rees, Ellicott City, all of Md.

[73] Assignee: The United States of America as represented by the Secretary of the Navy, Washington, D.C.

[22] Filed: Jan. 22, 1965

[21] Appl. No.: 428,022

[52] U.S. Cl. ................................ 340/3 R; 343/7 A
[51] Int. Cl.² .......................... G01S 9/66; G01S 7/66
[58] Field of Search ............... 343/5, 5 DP, 7, 17.1; 340/3; 328/108, 140, 165

*Primary Examiner*—Richard A. Farley
*Attorney, Agent, or Firm*—R. S. Sciascia; G. J. Rubens; T. M. Phillips

EXEMPLARY CLAIM

1. In combination in a sonar system for displaying a succession of echo signals received from a target illuminated respectively by a succession of transmitted pulses,
   means for generating a base threshold quantity related to background noise,
   a comparator for comparing the amplitude of each echo signal with the base threshold,
   first means responsive to received signals which pass said comparator for changing said base threshold in predetermined relatively small increments,
   second means responsive to received signals which pass said comparator for changing said base threshold in predetermined relatively large increments.

8 Claims, 1 Drawing Figure

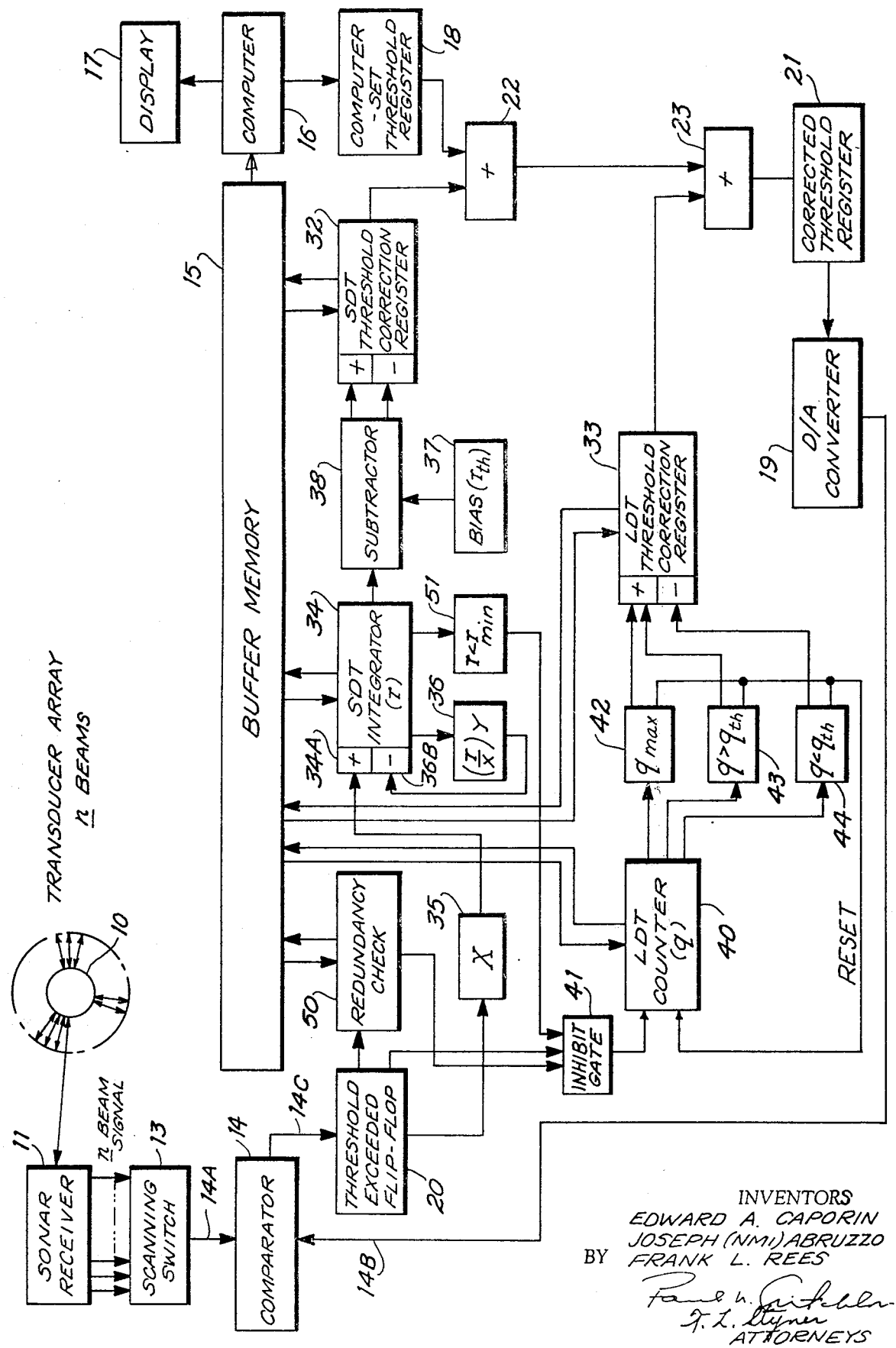

OVERFLOW THRESHOLD CONTROL FOR SONAR

The invention described herein may be manufactured and used by or for the Government of the United States of America for governmental purposes without the payment of any royalties thereon or therefor.

This invention relates to sonar receivers and is particularly directed to threshold control circuits.

Sonar systems currently developed and in use comprise an array of underwater transducers disposed in a planar or cylindrical array. Each transducer element is connected through separate circuits to the receiving equipment aboard ship. There the signals of the transducers are appropriately delayed by phase shifting or time delay networks, before combining, to increase the gain of the array in any one direction. In a typical circular array where there are provided 48 groups of transducers, or staves, the voltages may be so combined as to provide 48 simultaneous beams, 7½° wide at the half-power points. The array is thus effectively omnidirectional. For displaying target signals received from all points of the compass it is a simple matter to successively sample the returning beam voltages. Each beam voltage is separately amplified, sampled and displayed. In the process, many of the background noise voltages must be excluded from the signals so displayed, else the display screen would show many signals of no importance and the desired target signal would be obscured. It has been found necessary, then, to compare each incoming signal or sonar event with a locally generated threshold voltage which must be exceeded for the event to pass into the display circuits of the equipment. The threshold is generally established at a high enough level to exclude the more constant noise signals. If the background noises in the various beams are equally distributed, that is if their statistical characteristics do not vary appreciably with time, and if the background noises in the various beams all have the same statistics then a single constant threshold is sufficient and no overload threshold control is required. Unfortunately, experience shows that the background noises in the various beams are not equally distributed but statistically differ from beam to beam, and they contain upredictable high level localized noise signals. Under these conditions loss of desired target signals can only be avoided through the use of a separate automatically controlled threshold for each beam. The rise and decay time constants of the control circuits for these thresholds must be matched to the rate at which the background noise statistics are observed to vary. If the rise time constant is too short the onset of a desired signal could, if the signal is a long pulse, cause the threshold to increase too rapidly resulting in the loss of the latter portion of the signal. If, however, the decay time constant is too long a high level noise signal in a given beam will cause the sonar to become "blind" in that beam for a considerable period of time.

The object of this invention is to provide an improved threshold control system for sonar receivers.

The object of this invention is attained in a sonar system in which the events which exceed threshold are fed into the sonar data processing and display equipment. The data processor contains a digital computer which computes, from all beams, the necessary base threshold for application to the signal-to-threshold comparator. The basic threshold information provided by the computer is supplemented and kept up to date on a per beam basis by separate long time and short time integration circuits.

Qualitatively, the overflow threshold number is obtained in such a way as to alter the computer-set threshold for either sparse or dense clutter centers. In the presence of sparse clutter, the computer set threshold is increased for each beam on a per ping basis, by means of the long decay time threshold correction. This correction reduces to zero in the absence of sparse clutter. In the presence of dense clutter, extending beyond an expected target dimension such as an underwater reef, the computer-set threshold is increased by means of a short decay time circuit. In the absence of dense clutter, this correction also reduces to zero. Overload or signal saturation on any one beam will not affect the sensitivity of the system to target signals received in any of the other beams.

Other objects and features of this invention will become apparent to those skilled in the art by referring to the specific embodiment described in the following specification and shown in the accompanying drawing in which the preferred embodiment is shown in block diagram.

The transducer array 10 of the drawing contemplates a cylindrical arrangement of transducer elements, each of which is connected to the sonar receiver 11. Phase shifting networks, not shown, are provided for so combining the signals from the elements of the array as to produce simultaneously in $n$ circuits signals received on $n$ beams. In the specific array considered here $n$ is 48, the 48 transducer staves looking in diverging directions 7½° apart. The $n$ beam signals appear, respectively, on $n$ output leads from the sonar receiver. At 13 is shown the scanning switch equipment for successively sampling the beam signals on the $n$ signal lines. The single output lead of the scanning switch is applied to one of the two input terminals 14A of the analog comparator 14. The other input 14B of the comparator supplies the threshold voltage required for the particular beam being sampled. Those sonar signals appearing on terminal 14A wich exceed the threshold quantity applied to terminal 14B result in an enabling pulse on output terminal 14C. The enabling pulses at 14C are processed in the logic circuitry now to be described and find their way into the buffer memory 15 which then feeds the information into the permanent storage of computer 16 and finally to the display 17. For the purposes of this disclosure the comparator will be considered as of the analog type so that the two inputs thereto must be of analog voltages. If then the threshold-exceeded events are to be processed in digital circuitry the input and output of the comparator must contain the digital-to-analog converter 19 and the analog-to-digital converter 20.

In operation, the basic computer-set threshold derived from the 48 beams is presented in the computer set threshold register 18. The computer-set threshold number can be increased in adder 22 and in adder 23 during the sampling of each beam so that the corrected threshold register 21 may contain a new threshold number for each beam. The additions at adder 22 and 23 are, respectively, obtained from short decay time threshold correction register 32 and long decay time threshold correction register 33.

The implementation of the overflow thresholding hence consists of updating on a per ping basis a short decay time correction and a long decay time correction, the logic circuitry for updating being time shared for each of the 48 beams via the storage in the buffer memory 15. This means that the buffer memory must contain at least 48 addresses in which to store and retain information relative to each of the 48 sampled beams. Not shown is conventional interlocking circuitry for synchronizing the scanning switch 13 with the buffer memory address switching implementation.

The short decay time threshold correction is implemented with the short decay time (SDT) integrator 34. In one successful implementation, the integrator comprised a shift register with 11 significant stages. This digital register is increased a predetermined number of counts (X) for each event which exceeds the threshold, the multiplication factor, X, being a function of the length of the signal pulse. Multiplier 35 is connected between the add terminal 34A of register 34 and the output of the converter 20. In the absence of a threshold exceeded signal however, the count in integrator 34 is decreased a number which is a function of the number in the integrator. That is, the decrease is proportional to $(r/x)y$, where $x/y$ is the ratio of count up to count down, and is equal to the short decay time in sampling periods, and $r$ is the numerical contents of the SDT integrator. The integrator number $r$ is compared to the bias, $r_{th}$, the bias number corresponding to a sampling of events for a target of maximum aspect. The bias $r_{th}$ is selected to represent the target at maximum aspect and is applied to the subtractor 38. The content of the SDT threshold correction register 32 is increased or decreased as a function of whether this bias, $r_{th}$, is exceeded or not exceeded.

The long decay time correction number of register 33 is increased or decreased in response to the long decay time (LDT) counter 40. Counter 40 may comprise a conventional shift register and, according to this invention, reset logic circuits 42, 43 and 44. Logic circuits 43 and 44 may comprise AND-OR logic for reading out signals when the decimal number content of counter 40 exceeds or does not exceed, respectively, the predetermined quantity $q_{th}$. Also, circuit 42 reads out a reset pulse when the predetermined maximum number $q_{max}$ is equalled. Counter 40 is advanced one count for each event which reaches the counter from the comparator through the gate 41. Two inhibiting input terminals of the AND gate 41 are connected, respectively, to the redundancy flip flop 50 and to the minimum check 51. The redundancy check and it's inhibition is employed here where the ping pulses may be so long as to permit two or more returns from the same target during one beam sampling period. Where, for example, the ping pulse is 30 milliseconds or 120 milliseconds as in one operating system, it is necessary to disable the gate 41 after one threshold-exceeded signal is received. If counter 40 reaches its maximum $(q_{max})$, at any time during the receive mode, the threshold correction is advanced and the counter returned to 0. If the counter does not reach its maximum, the number $(q)$ is retained until the first range bin of the next ping. At this time the threshold correction is increased or decreased according to the comparison with the bias, $q_{th}$, whereupon the counter is reset.

If the integrator 34 comprises the 11 stages as stated it is contemplated that the register 32 should comprise three stages, counter 40 should comprise three stages, and register 33 should comprise five stages. As is well known, a register with $n$ stages is capable of two to the nth decimal numbers. Logic circuitry 51 may comprise, for example, AND and OR gates for reading out a pulse when the appropriate decimal number is attained in register $r$.

OPERATION

In describing the operation of the system shown in the drawing it will be assumed that for technical resons the transmitter, not shown, is capable of transmitting pulses of 2, 30 or 120 milliseconds in length. The longer pulses are capable of doppler detection whereas the shorter pings are capable of greater range resolution or definition of targets. After the transmission of a pulse, the receive mode is started and each of the 48 received beam signals are successively sampled. As stated, the distance the transmitted pulse travels during successive samplings of one beam is called a bin.

Referring to the block diagram of the drawing, the sequence of information flow during one beam sampling period is as follows. First, during the first range bin and before the first possible received signal after transmission, the LDT count and the correction number are accessed from the appropriate address of the buffer memory. It will be assumed that the system has been operating for some time and that each of the 48 addresses in the buffer memory and the computer memory contains information concerning previous transmissions. The LDT correction number in register 33 is increased or decreased according to whether the LDT counter content, $q$, is greater than or less than the number $q_{th}$. Then the LDT counter is reset. During the next and succeeding range bins the redundancy check bit, the short decay time integrator word, and the short decay time threshold correction number are accessed from the buffer memory in addition to the LDT words.

Next, the SDT and the LDT corrections are added to the computer set threshold in adders 22 and 23 and are inserted into the corrected threshold word register 21. Next, the corrected threshold word is compared with the incoming signal to determine if the threshold is exceeded. As stated, the comparison may be made in digital form if desired, in which case the converters 19 and 20 would be eliminated. If the incoming sonar signal exceeds the threshold, the output of the comparator, through converter 20, enables redundancy check logic 50, the multiplier 35 and the gate 41. Information concerning the duration of the received pulse be it 2, 30, or 120 milliseconds, is of course readily obtainable from the transmitter.

The SDT integrator 34 is decreased, by logic circuit 36, a number of counts which is a function of the number standing in the integrator.

If the threshold is exceeded and the pulse is long, such as 30 or 120 milliseconds, the state of the redundancy flip-flop 50 is reversed, the redundancy check not being employed in the 2 millisecond mode. In case the signal does not exceed the threshold the redundancy flip-flop is reset to 0.

Next, if the threshold is exceeded, but was not exceeded during the previous range bin in the 120 and 30 millisecond modes, the SDT integrator is advanced a number of counts, X. In the 2 millisecond mode the SDT counter is always advanced whenever the threshold is exceeded.

If now the threshold is exceeded, but was not exceeded during the previous range bin in the 120 ms and the 30 ms modes, and the SDT integrator does not exceed the minimum $(r_{min})$, the two inhibitions are removed from AND gate 41 and the LDT counter 40 is advanced one count.

If the LDT counter is at the maximum ($q_{max}$), the LDT threshold correction count in register 33 is advanced and the LDT counter 40 reset to 0.

Next, the contents of 34 SDT integrator 34 are compared to the bias ($r_{th}$) by subtraction and if the bias is exceeded the SDT correction number is increased. If, however, the bias is not exceeded the SDT threshold correction number is decreased.

Finally, the SDT integrator number, the SDT correction number, the LDT counter number, the LDT correction number, and the redundancy flip-flop number are all transferred to and stored in the appropriate address of the buffer memory, preparatory for the next beam sampling cycle.

In designing a threshold control system according to this invention, the SDT integrator should have capacity to receive the maximum number which would be required if a threshold exceeded event occured for every sample during the short decay time interval. Preferably the short decay time is chosen to be about twice the length of a target at maximum aspect, $r_{max}$. The count-up number $x$, is chosen to be equal to the decay time in samples.

What is claimed is:

1. In combination in a sonar system for displaying a succession of echo signals received from a target illuminated respectively by a succession of transmitted pulses,
   means for generating a base threshold quantity related to background noise,
   a comparator for comparing the amplitude of each echo signal with the base threshold,
   first means responsive to received signals which pass said comparator for changing said base threshold in predetermined relatively small increments,
   second means responsive to received signals which pass said comparator for changing said base threshold in predetermined relatively large increments.

2. In the combination defined in claim 1,
   said first means comprising a long decay time counter coupled to the output of said comparator, and a long decay time register coupled to the output of said counter, and
   logic circuit means coupled between said counter and register for increasing and decreasing, respectively, the content of said register in response to relatively high and relatively low quantities in said counter.

3. A system for displaying repetitive sonar signals received from a target comprising,
   means for generating a base threshold voltage commensurate with average noise voltage amplitude,
   means for comparing each received sonar signal with said threshold voltage,
   a short decay time register with logic circuitry coupled to said comparing means for accumulating digital counts at a relatively fast rate in response to each threshold-exceeded signal and dissipating said counts at a relatively fast rate in the absence of signals,
   a long decay time register with logic circuitry coupled to said comparing means for accumulating digital counts at a relatively slow rate in response to each threshold-exceeded signal and dissipating said counts at a relatively slow rate in the absence of signals, and
   means coupling said registers and said base threshold generating means for modifying the amplitude of said threshold voltage in response to frequency of occurrence of sonar signals.

4. The system defined in claim 3 further comprising,
   a transducer array with means for simultaneously generating in separate circuits a plurality of beam signals arriving at said array from different discrete directions,
   scanning switch means for successively connecting said separate circuits to said comparing means for successively sampling said beam signals,
   a buffer memory with a plurality of different storage addresses, and
   means for storing the contents of said registers in said memory at an assigned address after one beam sampling period and for returning the stored information to said registers at the beginning of the succeeding sampling period.

5. In the system defined in claim 3, said short decay time logic circuitry comprising,
   an integrator
   a multiplier coupled between the output of said comparing means and the input of said integrator for increasing the digital count in said integrator an amount greater than one each sampling period yielding a threshold-exceeded signal, and
   logic circuitry in said integrator for decreasing said digital count an amount greater than one each sampling period not yielding a threshold-exceeding signal.

6. In the system defined in claim 3, said long decay time logic circuitry comprising,
   a long decay time counter coupled to said comparing means for increasing by one the digital count in said counter in response to each threshold-exceeded signal, and
   a first read-out circuit for said counter for adding one count to said long decay time register when the contents of said counter exceeds a predetermined number, and
   a second read-out circuit for said counter for subtracting one count from said long decay time register when the contents of said counter is less than said predetermined number.

7. In the system defined in claim 6 said long decay time logic circuitry comprising,
   a third read-out circuit for said counter for resetting to zero the contents of said counter when said contents reaches a predetermined maximum number.

8. In combination in a sonar system for successively sampling sonar beam signals received at a transducer array from a plurality of directions in response to each transmitted pulse, and buffer storage means for storing each threshold-exceeded signal at a different address in said buffer memory, said combination comprising,
   a comparator with two input circuits and one output circuit,
   a source of base threshold signal coupled to one of said inputs,
   a scanning switch means for successively applying said beam signals to the other of said input circuits,
   a short decay time integrator and a short decay time threshold correction register coupled to the output of said comparator,
   a long decay time counter and a long decay time threshold correction register coupled to the output of said comparator, and means for adding the short decay time correction and the long decay time correction to said base thresh- old signal.

* * * * *